United States Patent [19]
Udd et al.

[11] Patent Number: 4,787,741
[45] Date of Patent: Nov. 29, 1988

[54] FIBER OPTIC SENSOR

[75] Inventors: Eric Udd, Huntington Beach; Ronald J. Michal, Orange; Steven F. Watanabe; John P. Theriault, both of Fountain Valley; Richard F. Cahill, El Toro, all of Calif.

[73] Assignee: McDonnell Douglas Corporation, Long Beach, Calif.

[21] Appl. No.: 917,390

[22] Filed: Oct. 9, 1986

[51] Int. Cl.⁴ ................................................ G01B 9/02
[52] U.S. Cl. ..................................... 356/35.5; 356/345
[58] Field of Search ..................... 356/35.5, 345, 350; 250/227

[56] References Cited

U.S. PATENT DOCUMENTS

| | | | |
|---|---|---|---|
| 4,238,856 | 12/1980 | Bucaro et al. | 73/655 X |
| 4,375,680 | 1/1983 | Cahill et al. | 73/655 X |
| 4,517,456 | 5/1985 | Halsall et al. | 250/227 X |
| 4,543,961 | 10/1985 | Brown | 250/227 X |
| 4,545,253 | 10/1985 | Avicola | 250/227 X |
| 4,632,551 | 12/1986 | Pavlatch | 250/227 X |
| 4,634,852 | 1/1987 | Shaw | 250/227 |
| 4,653,916 | 3/1987 | Henning et al. | 250/227 X |

Primary Examiner—Davis L. Willis
Assistant Examiner—Matthew W. Koren
Attorney, Agent, or Firm—Benjamin Hudson, Jr.; George W. Finch; John P. Scholl

[57] ABSTRACT

There is provided a fiber optic sensor for sensing environmental effects on counterpropagating light beams in an optical loop by comparing the modulation of the light beams in an optical coil exposed to the environmental effects and comparison with a reference fiber shielded from the environmental effects. The counterpropagating light paths contain optical phase modulators for creating nonreciprocal phase shifts and may comprise elongated sections forming a long line array.

29 Claims, 8 Drawing Sheets

FIG. 16
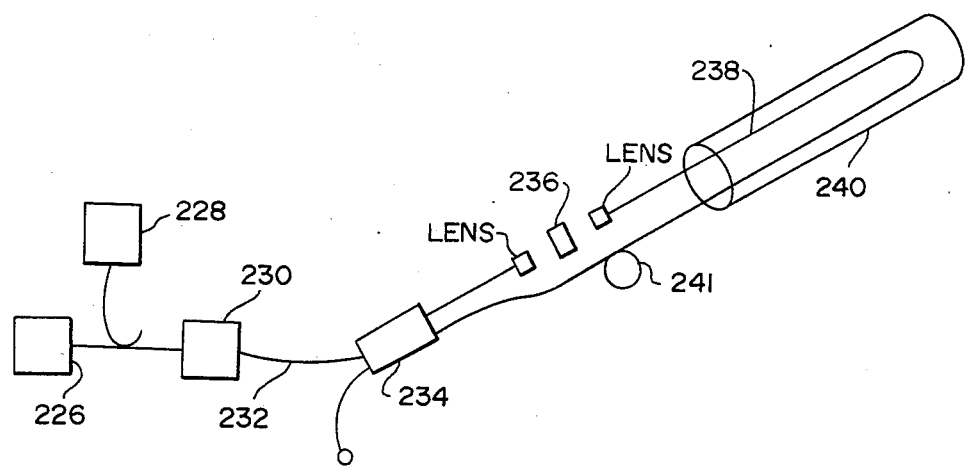
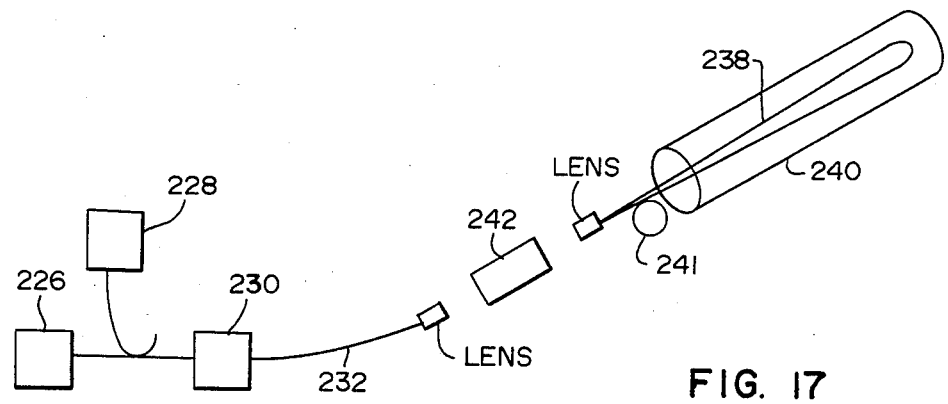
FIG. 17

FIG. 18
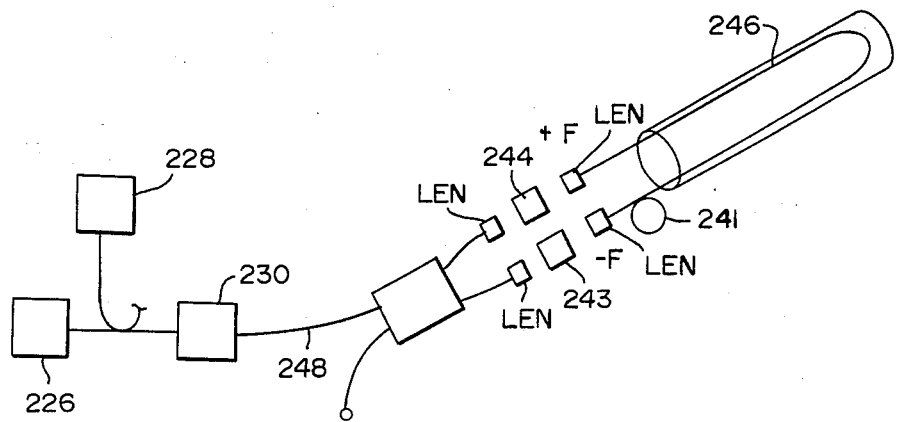
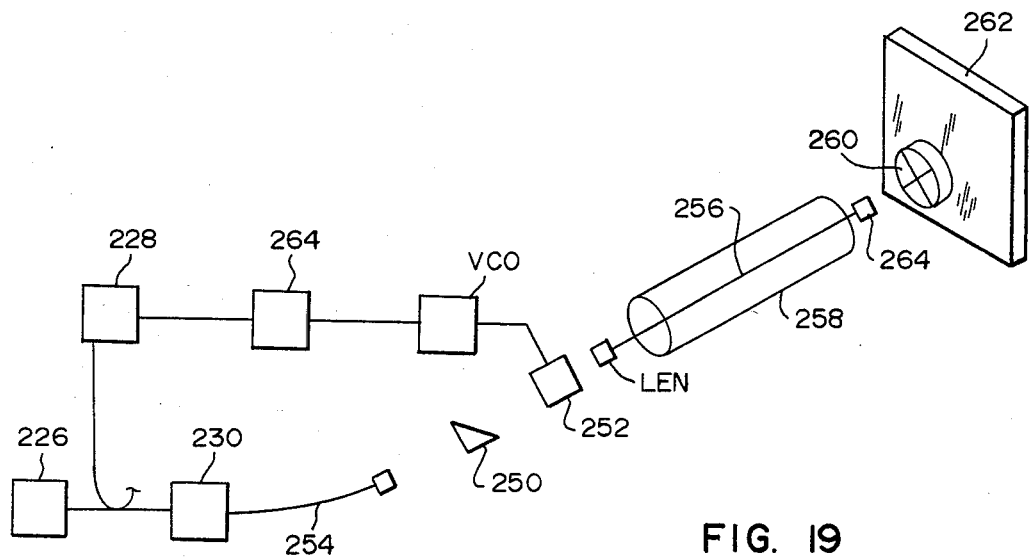
FIG. 19

FIBER OPTIC SENSOR

BACKGROUND OF THE INVENTION

1. Field of the Invention

This invention relates generally to fiber optic detection systems for acoustics and other environmental effects, and more particularly to detection systems that utilize modulation of light signals in optical fibers.

2. Description of the Prior Art

Numerous systems have been developed to take advantage of the phase change undergone by a light beam traversing an optical fiber that is subjected to an acoustical wave. One such system was reported in the article "Single Fiber Interferometric Acoustic Sensor," by J. A. Bucaro and E. F. Carome, *Applied Optics,* Volume 17, No. 3, pgs. 330–331, Feb. 1, 1978.

In another system described in U.S. Pat. No. 4,193,130 entitled "Fiber Optic Hydrophone" for use as an underwater electro acoustic standard issued to A. Mark Young, et al, a system is proposed that subjects the sensor fiber coil and the reference fiber coil to the same pressure and temperature changes, but separates the reference fiber coil in an acoustically isolated compartment.

In another system described in U.S. Pat. No. 4,238,856 entitled Fiber Optic Acoustic Sensor, issued to Joseph A. Bucaro, light is transmitted into a single mode optical fiber in which optical beams are internally back reflected by the ends of the fiber such that the back reflected beams create a beam excitation having beat oscillations that are detected at the output of the fiber.

Also, U.S. Pat. No. 4,375,680, issued to R. F. Cahill, et al and assigned to the assignee of the instant application describes a fiber optic acoustic sensor based on the Sagnac interferometer.

In all of the systems described it is desirable to provide more accurate systems that minimize extraneous noise offsets that distort the output signal. It is an object of this invention to provide an optical fiber sensor that has a digital output, wide dynamic range, the capability of forming an array out of a single fiber and is compatible with multiplexing techniques allowing arrays to be formed with a single optical processing unit.

SUMMARY OF THE INVENTION

There is provided by this invention a fiber optic sensor that directs counterpropagating light beams about a path that contains an isolated reference fiber coil and a signal fiber coil for detecting frequency changes in the signal fiber coil induced by an environmental effect. The path also contains optical phase modulators for treating nonreciprocal phase shifts between the counterpropagating light beams.

Also provided by this invention is a digital fiber-optic elongation sensor which contains an elongation sensitive portion of the fiber coil. The elongation sensitive fiber length is provided by placing a frequency shifter in the fiber coil at a distance from center of the coil. Nonreciprocal phase shifts caused by elongations can be nulled out by adjusting the frequency of the frequency shifter.

BRIEF DESCRIPTION OF THE DRAWINGS

FIG. 7 illustrates a fiber optic sensor utilizing a single optical sensing fiber having time domain reflectometry techniques and reflective structures in the sensing fiber;

FIG. 8 illustrates a digital fiber optic sensor similar to the one illustrated in FIG. 1 having dual frequency shifters;

FIG. 9 illustrates a digital fiber optic sensor having a single fiber sensing probe and dual frequency shifters;

FIG. 10 illustrates a digital fiber optical sensor with a color multiplexed single optical fiber sensing probe;

FIG. 11 illustrates an acousto-optic modulator which in combination with an optical fiber acts as a color filter;

FIG. 16 illustrates a simple digital fiber-optic elongation sensor, referred to as the basic configuration, with a single frequency shifter;

FIG. 17 illustrates a digital fiber-optic elongation sensor with a single element used as a frequency shifter and a beamsplitter;

FIG. 18 illustrates a digital fiber-optic elongation sensor with dual frequency shifters to provide thermal compensation;

FIG. 19 illustrates a digital fiber optic elongation sensor with a single frequency shifter, polarization preserving fiber, a quarter wave plate, a mirror and a polarizing element;

BRIEF DESCRIPTION OF THE PREFERRED EMBODIMENT

Figure 1:
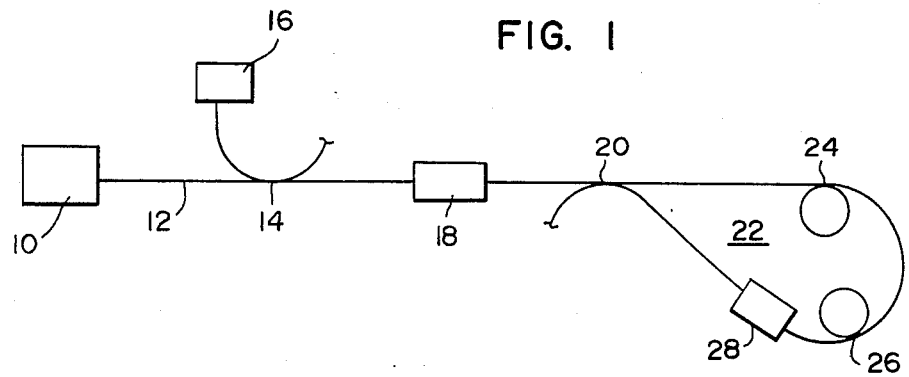
FIG. 1 illustrates a fiber optic sensor incorporating the principals of this invention.

Referring to FIG. 1, there is shown a fiber optical acoustic sensor. A light source 10 which may be a light emitting diode (LED) or pigtailed superradiant diode inputs a light beam into an optical fiber 12 that is connected to a beamsplitter 14. One output of the beamsplitter 14 is connected to an an output photo detector 16. Another output of the beamsplitter 14 is connected to a polarizer 18. The output of the polarizer 18 is fed to a beamsplitter 20 that splits the polarized beam into two counterpropagating light beams. One output of the beamsplitter 20 is connected to a first end of an optical fiber loop 22 that receives the clockwise propagating light beam. The optical loop 22 has contained therein a reference fiber coil 24 that is acoustically isolated from a signal fiber coil 26 which is disposed to be modulated by acoustical wavefronts. The optical loop 22 is terminated at its opposite end by an intensity maintenance element 28 that is connected to the beamsplitter 20. The counterclockwise beam exits the beamsplitter and enters the loop 22 at this end. The intensity maintenance element consists of two lengths of birefringent fiber that are oriented at 45° to each other and spliced into the fiber loop 20. The action of the intensity maintenance element is to scramble the polarization at the light propagating through the fiber loop 20 so that the signal level through the system is preserved. Alternatively polarization preserving optical fiber may be used throughout the system which may result in higher performance at a greater cost. When the turns of the sensor coil 26 are subjected to an environmental effect such as the pressure of an incident acoustical wave, the index of refraction and the length of the sensor coil will be changed. The time dependent change in the physical structure of the fiber creates a relative phase shift between the counterpropagating light beam passing through the sensing coil. The fiber optic sensor may be made sufficiently small compared to the wavelength of an acoustical wave such that the wave can be considered as acting as an instantaneous linear pressure gradient against the optical fiber loop 22. In the absence of acoustical shielding around the reference coil 24, there would be no phase difference between the counterpropagating beams because both beams would have reciprocal phase shifts which would cancel out at the detector. The counter propagating beams recombine at the beamsplitter 20 and the recombined light beam forms interference fringes which are detected at the photo detector 16. The relative phase of the counterpropagating beams is imbalanced by the difference in fringes induced by the acoustical wave.

Figure 2:
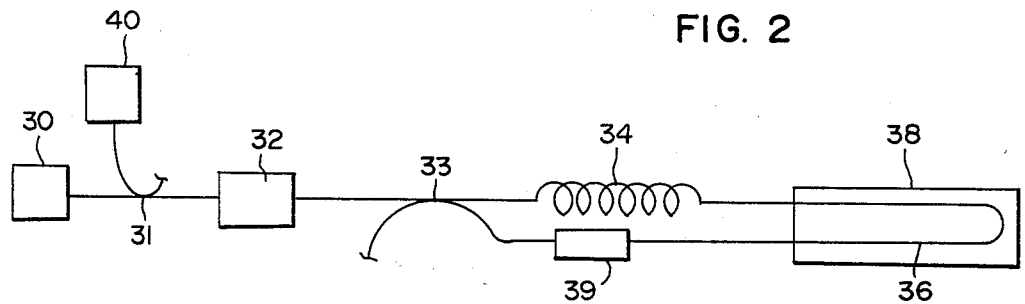
FIG. 2 illustrates a fiber optic sensor in a long line array.

Referring to FIG. 2, there is shown a fiber optic sensor having a long line array. Light from the source 30 is coupled to a fiber beamsplitter 31 that has connected thereto a photo detector 40 and polarizer 32. The output of the polarizer 32 is connected to a second beamsplitter 33 that acts to generate counterpropagating beams. The counterpropagating beams propagate through the reference fiber 34 which is acoustically isolated from the signal section 36. The signal fiber section 36 may be encased in a protective sleeve 38. This arrangement provides a very long thin sensor. An intensity maintenance element 39 is also provided in the loop. The counterpropagating beams recombine and fall onto the detector 40. When an oscillating environmental signal falls upon the signal coil 36, it generates an oscillating phase difference between the beams that result in intensity fluctuations on the detector 40.

Figure 3:
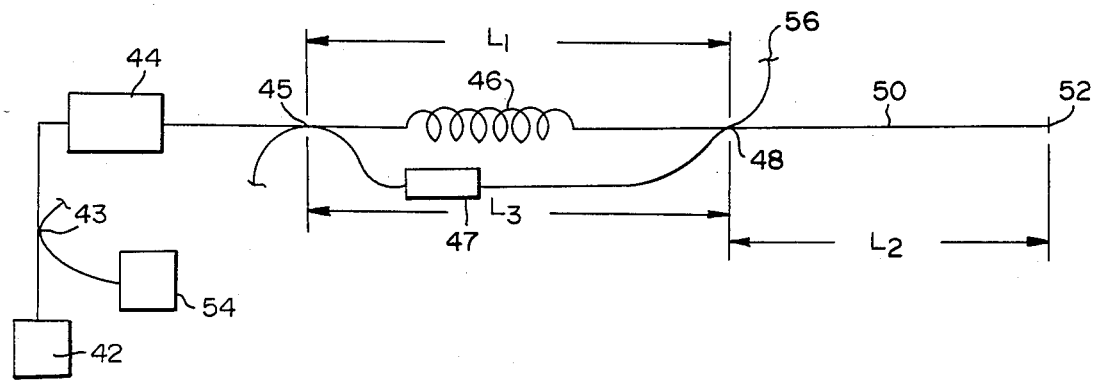
FIG. 3 illustrates a fiber optic sensor utilizing a single sensing fiber configuration.

Referring to FIG. 3, there is shown a fiber optic sensor that utilizes a single fiber element as the sensing section. Light passes from the source 42 and enters a beamsplitter 43 that has connected thereto a photodetector 54 and polarizer 44. The output of the polarizer 44 is connected to a second beamsplitter 45 that generates counterpropagating beams of light. The clockwise light beam passes through the reference coil 46 and into the sensor input beamsplitter 48. The counterclockwise light beam passes through the intensity maintenance element 47 and into the sensor input beamsplitter 48. The sensor beamsplitter 48 directs the light signal into the signal fiber 50. This signal fiber 50 has a mirror at its termination 52 such that the signal beams propagate through the fiber and are reflected back into the system. The beams are recombined at the beamsplitter 45 and directed into the detector 54. By adjusting the coherence length of the light from the source 42, only the desired counterpropagating signal beams can be made to interfere constructively on the detector 54. The beam propagating in the clockwise direction in FIG. 3 traverses a distance given by $L_1+2L_2+L_3$ as it goes through the reference coil 46, the signal fiber 50 twice, and the remainder of the fiber coil length $L_3$. Similarly, the counterclockwise propagating beam goes through $L_1+2L_2+L_3$. Now since the end 56 is terminated to be nonreflecting, the major source of possible extraneous reflections is at the mirrored end 52. However, there are only two paths for these reflections whose distance is given by $2L_1+2L_2$ and $2L_2+2L_3$. Looking at these relationships, it is apparent that as long as the difference in path lengths between $L_1$ and $L_3$ exceeds the coherence length of the light source these beams will not interfere constructively with each other or with the signal beams. Time dependent changes of the length of fiber $L_2$ due to environmental effects such as acoustic waves result in a phase difference between the counterpropagating that is used to generate the output signal.

Figure 4:
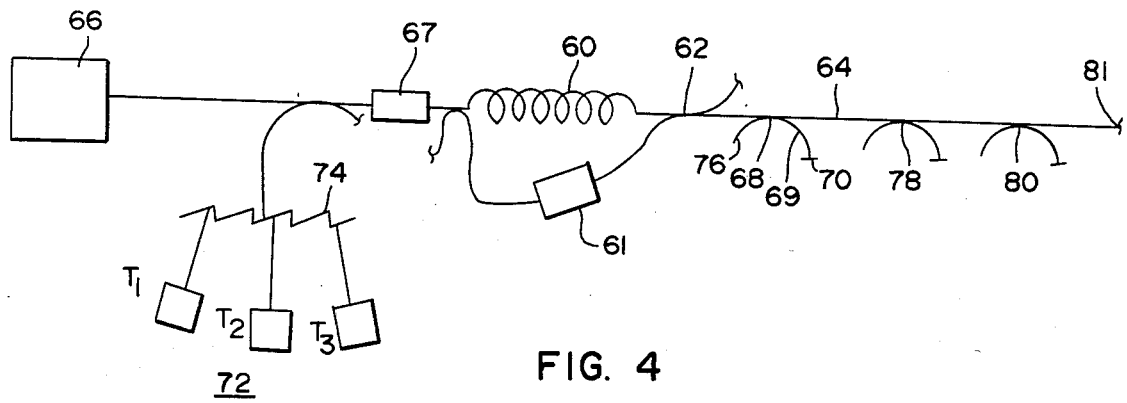
FIG. 4 illustrates a fiber optic sensor utilizing a single optical sensing fiber having wavelength division multiplexing and in-line fiber beam splitters.

FIG. 4 illustrates a reference coil 60 and intensity maintenance element 61 in a counterpropagating loop connected by the beamsplitter 62 to an array that may be formed using fiber optic beamsplitters spaced along the fiber sensing element 64. The light beam from the light source 66 and polarizer 67 is divided by the beamsplitter 68 such that a portion of the light beam is directed to a mirror 70 which reflects light of a selected wavelength $T_1$ so that the light returned to the system is encoded by color and the return signal may be picked up by the detectors 72 via the wavelength selective grating 74. Extraneous reflections from this element are eliminated by appropriately terminating end 76. The array is terminated by reflective end 81. The output signal is proportional to the environmental modulation picked up by the sensing element 69. Other beamsplitting elements 78 and 80 operate in a similar fashion with other selected wavelengths, $T_2$ and $T_3$.

Figure 5:
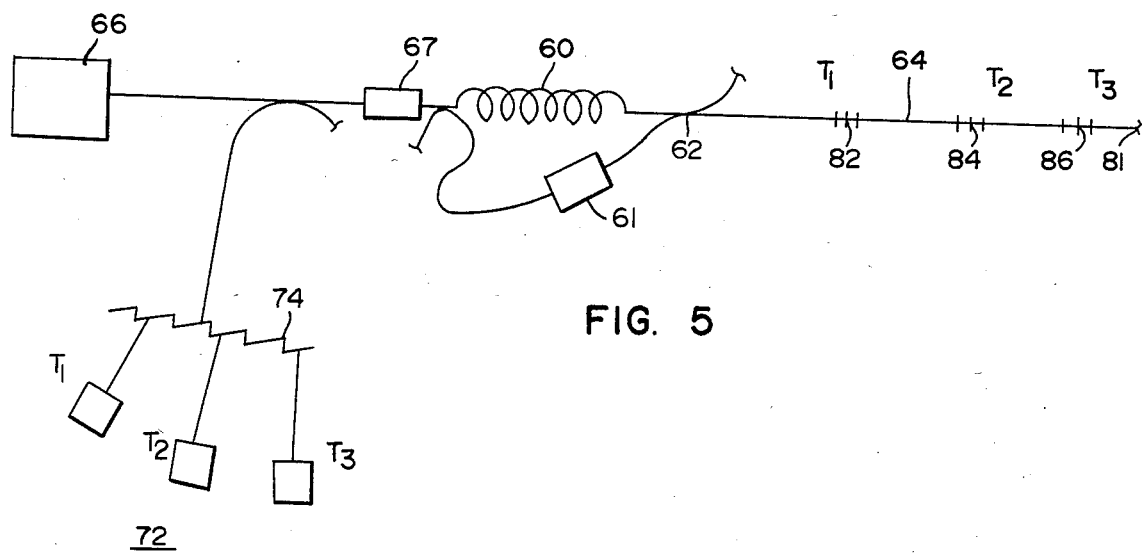
FIG. 5 illustrates a fiber optic sensor utilizing a single optical sensing fiber having wavelength division multiplexing and in line reflectors.

Referring to FIG. 5, there is shown a fiber optic sensor utilizing the single fiber array having the doped elements 82, 84, and 86 appropriately located along the length of the optical fiber so that light of selected wavelengths is reflected back to the appropriate detectors. In both FIGS. 4 and 5 the light source 66 would have to be sufficiently broadband to support multiple elements. It is possible to use this type of light source since the devices are based on the Sagnac interferometer and the paths of the two counterpropagating signal beams are automatically closely matched.

Figure 6:
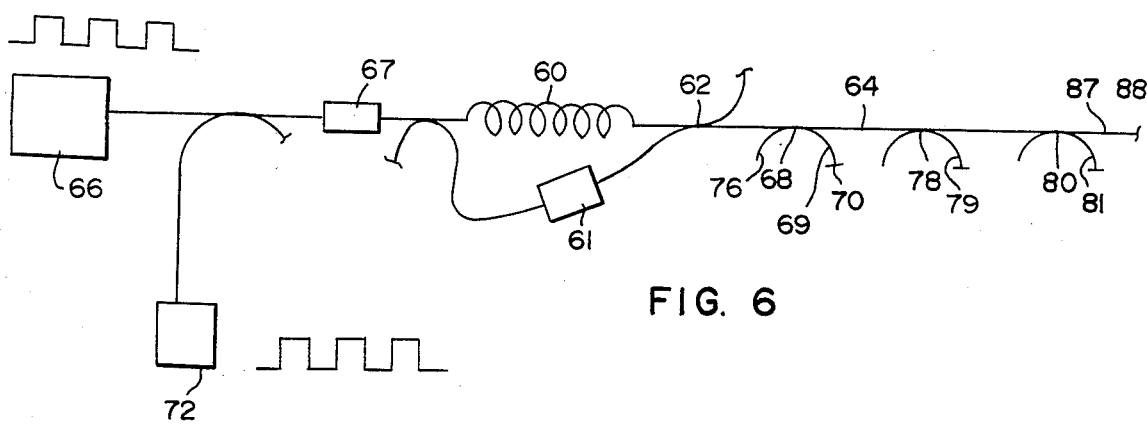
FIG. 6 illustrates a fiber optic sensor utilizing a single optical sensing fiber having time domain techniques and beam splitters.

An alternate to using wavelength multiplexing techniques is to take advantage of time domain reflectometry. FIG. 6 illustrates a system using fiber beamsplitters. Here the sensitive elements such as 69 are structured such that the end 70 is reflective while the end 76 is terminated to avoid extraneous reflections. Pulses are emitted from source 66 and timed with respect to the detector 72 so that each sensing element 69, 79, and 81 are interrogated sequentially. That is, if a pulse of light is emitted from the source, four return signals from the elements 69, 79, 81, and 87 would be received in time by the interval required by light to travel twice successive optical distances between the elements. FIG. 7 illustrates a similar arrangement wherein a single fiber element has been used and the fiber is caused to be partially reflective in the regions 82, 84, and 86 by doping.

FIG. 8 illustrates a digital fiber optic sensor that incorporates the principals of this invention. Light from a source 90 such as a super-radiant laser diode or light emitting diode is coupled into an optical fiber 92. The light beam is split by a beamsplitter 94 having one output port connected to an output detector 110. The other output port is connected to a polarizing element 96 and a second beamsplitter 98 that splits the beam into counterpropagating light beams. The clockwise light beam propagates through a reference fiber 100 of length L that is isolated from the environmental effect to be sensed. The clockwise light beam is then frequency shifted to a frequency $F_1$ by the frequency shifter 102 and passes through an interconnecting optical path 104 of length $L_1$ to a second frequency shifter 106 where the light is frequency shifted by a frequency $F_2$. The clockwise light beam then enters a sensing fiber 108 of length L+DL which is exposed to the environment to be sensed. The counterpropagating light beam propagates through the elements 108, 106, 104, 102, and 100 in the counterclockwise sense and is also frequency shifted by $F_1 + F_2$. The counterpropagating light beams recombine at the second beamsplitter at the same frequency so that they can be compared in phase. The reciprocal portion of the recombined beams pass back through the polarizer 96 and the beamsplitter 94 where they are directed onto the output detector -110.

To understand the operation of the system, consider that in the absence of an environmental disturbing effect on the sensing fiber 108, $D_L = 0$ and 108 has a length equal to the reference fiber 100. When an environmental change disturbs the sensing fiber, $D_L$ becomes nonzero and a relative phase difference between the counterpropagating beams is generated by (1) $Z_S = DLn (F_1 + F_2)/C$ where $Z_S$ is the difference in fringes between the counterpropagating beams induced by this effect, n is the index of refraction of the fiber, and C is the speed of light in vacuum. This nonreciprocal phase shift can be offset by the action of the frequency shifters 102 and 106 in combination with the path length separation between them. In particular, if a fiber of index of refraction n separates the two frequency shifters 102 and 106 then the nonreciprocal induced phase shift between the counterpropagating beams is given by (2) $Z_F = (F_1 - F_2) L_1 n/C$.

By offsetting the environmentally induced phase shift $Z_S$ by the frequency induced phase shift $Z_F$, we have $Z_S = Z_F$ and from Equations (1) and (2)

(3) $DF = (F_1 - F_2) = (DL/L_1)(F_1 + F_2)$.

Equation (3) illustrates that the system of FIG. 8 has a digital output frequency DF corresponding to the environmentally induced path length change DL.

FIG. 9 illustrates a digital fiber optic sensor configured with a single fiber sensing probe. The light source 120 couples the light beam into the optical fiber 122. The light beam is split by the beamsplitter 124 having one output connected to the output detector 126. The other output is connected to a polarizing element 128. A second beamsplitter 130 splits the beam into counterpropagating beams. The clockwise beam passes through the reference fiber 132 the frequency shifter 134, the interconnecting length 136, and frequency shifter 138. After it passes through the frequency shifter 138, the light beam enters the third beamsplitter 140. A portion of the light beam enters the single fiber sensing probe 142. The light beam travels down the sensing probe 142 and is reflected back by the reflective end 144. The light beam reenters the beamsplitter 140 and a portion of it is directed back to the second beamsplitter 130. The other portion of the light beam is directed back in a counterpropagating direction through the system and recombines at beamsplitter 130. By choosing a broad band source in combination with appropriate path length selection, the beams not traveling along a reciprocal path in a square loop will not interfere with the signal beams which do travel a reciprocal path. The counterclockwise beam propagates in the opposite direction through the system and also has a back scattered beam associated with it at the beamsplitter 130 that does not affect the output signal. The two counterpropagating beams recombine on the beamsplitter 130. The reciprocal portion of the combined beam passes through the polarizer 128 and enters the beamsplitter 124 where it is directed to the output detector 126.

FIG. 10 is a fiber optic digital sensor similar to that shown in FIG. 9 wherein color selective reflector elements 146 and 148 are added to the sensing probe 142 to selectively reflect a particular color band width. The output light beam of the system passes through a dispersive element 150 such as a grating or prism which separates the colors reflected by the elements 146 and 148 onto detectors 152, 154, and 156, respectively. In this manner the system shown can be used to monitor segments of the signal fiber probe independently forming an array that is useful for signal processing. In this situation, the output of detector 152 would monitor the action of environmental effects on the region between 140 and 146; detector 154, the region between 140 and 148, and the detector 156 between the regions 140 and 144. By subtracting the signal 152 from 154, the region from 146 to 148 may be monitored and similarly by subtracting the signal of 154 from 156, the signal in the region 148 to 144 may be monitored. Also, multiple beam splitters may be substituted for the reflected elements as shown in FIGS. 4 and 6.

FIG. 11 illustrates how color multiplexing may be accomplished when the frequency shifters of FIGS. 8, 9, and 10 are acousto-optic modulators. The light beam 160 consisting of light at the wavelengths A, B, and C enters the acousto-optic modulator 162 at the Bragg angle. The acousto-optic modulator 162 is being operated so that an acoustic wave 170 passes through the crystal and has a wavelength D. Since the light beam is at the Bragg angle with respect to the acoustic wave 170, interaction between the light and acoustic wave occurs and frequency shifted beams 164, 166, and 168 are generated at angles A/D, B/D, and C/D. These light beams are focused by a lens 172 onto the fiber 174. However, by choosing the wavelengths A, B, and C to be sufficiently separated, only one wavelength will enter the fiber which acts as a spatial filter. Thus the system shown in FIG. 11 acts as a color selective filter for a particular wavelength. Note also that by changing the wavelength of the acoustic wave, the angles at which the beams are deflected will change and other colors would be selected.

Figure 12:
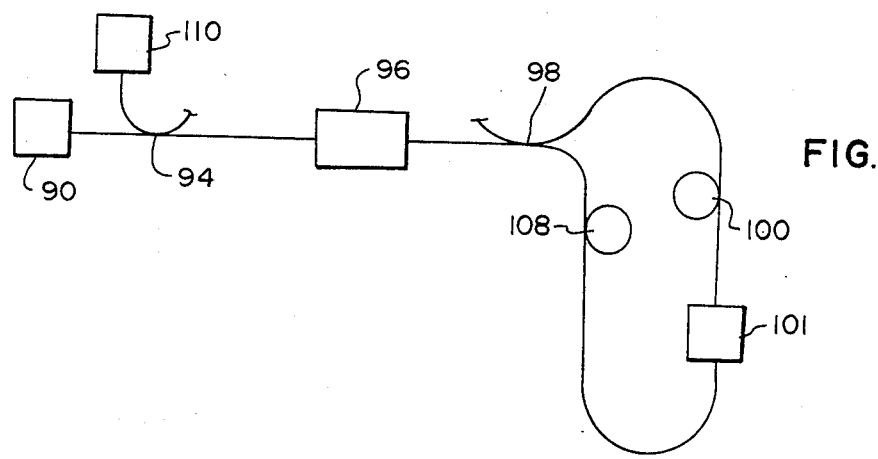
FIG. 12 illustrates a fiber optic sensor having a phase modulating means in the sensing loop.

For the fiber optic sensors shown in FIGS. 8, 9, and 10 that utilize dual frequency shifters for upshifting and downshifting the counterpropagating beams, the two frequency shifters such as 102 and 106 in FIG. 8 may be replaced with a single phase modulator. FIG. 12 illustrates a fiber optic sensor similar to the sensor shown in FIG. 8 wherein the dual frequency shifters 102 and 106 have been replaced by a single phase modulator 101. The phase modulator 101 must be offset from the center of the fiber path for the counterpropagating light beams so that the phase shift does not cancel out at the detector 110.

Figure 13A:
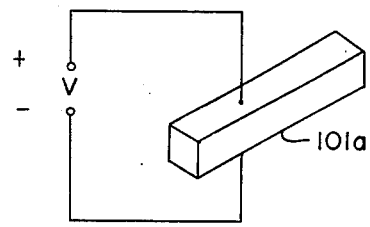
FIGS. 13A, B, and C illustrate various embodiments of the phase modulating means of FIG. 12.

FIGS. 13A, B, and C illustrate phase modulator designs for use in FIG. 12. In FIG. 13A, an electro-optic crystal 101a such as lithium niobate is connected within the loop and a sawtooth voltage applied to the crystal to phase shift the counterpropagating beams.

Figure 13B:
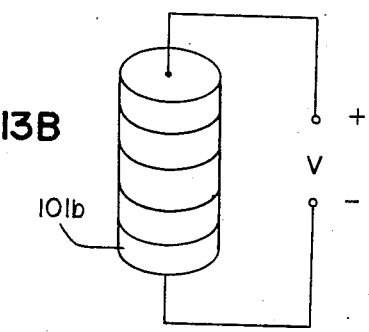
Figure 13C:
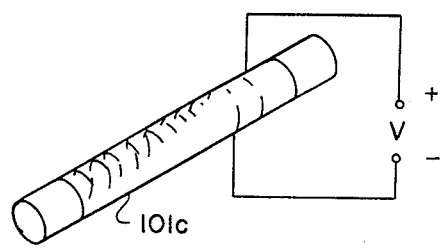

In FIG. 13B, a piezoelectric mandril 101b has a multitude of fiber optic windings through which pass the counterpropagating beams that are phase shifted as a sawtooth voltage is applied to the mandril. FIG. 13C illustrates the phase modulator being constructed of a length of fiber having a piezoelectric coating 101c wherein the phase of the beams are shifted by applying a sawtooth voltage signal to the coating which compresses the fiber to modulate the light beams.

Figure 14:
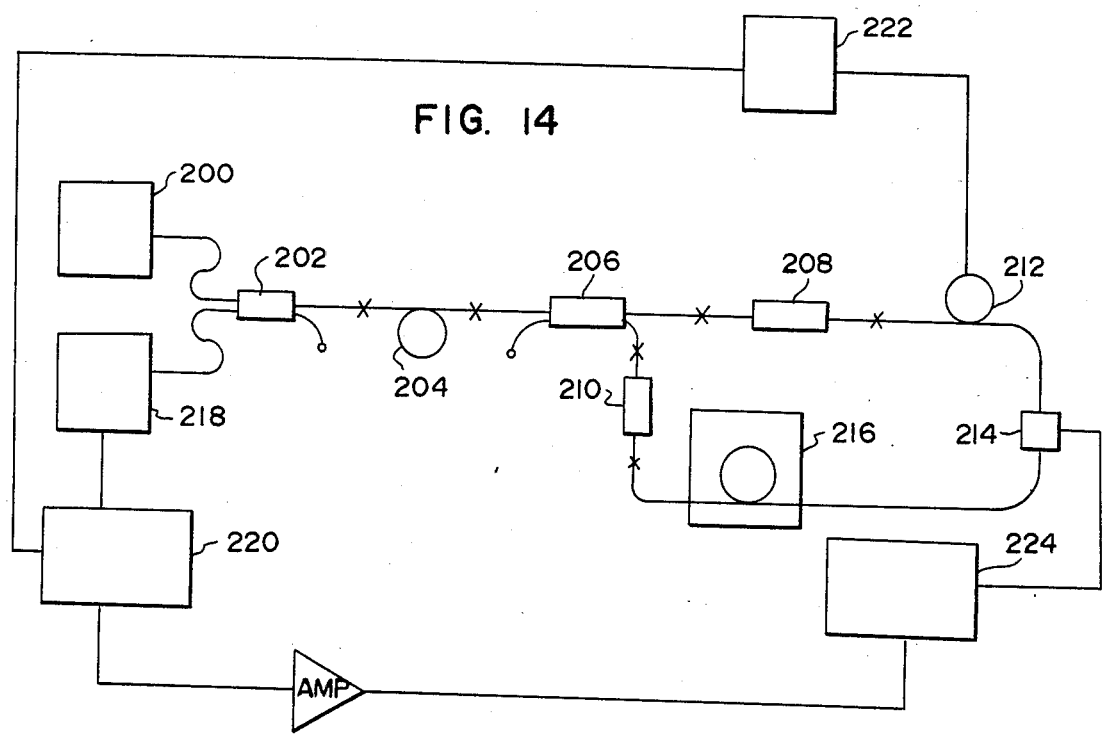
FIG. 14 illustrates a digital fiber-optic elongation sensor having a length of single mode fiber for sensing changes in elongation.

FIG. 14 illustrates how a digital fiber-optic sensor can be utilized to measure elongations or strain. This device can operate as a closed-loop digitally nulled Sagnac interferometer. Light from a source 200 is coupled into one of the ports of a fiber-optic beamsplitter 202. Light exits this beamsplitter and is polarized in a polarizer 204. The other part of the beamsplitter (202) may be used to monitor the output of the light source with a photo detector. The beam of light exits the polarizer and enters a second beamsplitter 206 where it is split into counterpropagating beams of light. Both counterpropagating beams of light travel through depolarizing elements 208 and 210 to ensure there is no intensity fadeout due to environmental effects. The clockwise beam travels through a phase modulating element 212 which acts to phase modulate the light at a frequency of W. The clockwise beam then travels through a frequency shifter 214 where it is frequency shifted and then travels through the elongation sensitive coil 216. It exits this coil and travels through depolarizing element 210. It then travels back to the fiber-optic beamsplitter 206. The counterclockwise beam travels the same path but in the opposite direction. This beam travels through the elongation sensitive coil 216 before being frequency shifted by the frequency shifting element 214. Both clockwise and counterclockwise beams recombine at the beamsplitter 206 and are directed back to beamsplitter 202 which in turn directs the light to a photo detector 218. Both beams of light mix on the detector at the same frequency. The signal is synchronously demodulated by a lock-in amplifier 220 which demodulates the signal at the frequency W of the PZT phase modulator driver 222. In the absence of elongation or contraction, the second and higher even order harmonics of the phase modulator appears on the detector 218. When there is an elongation or contraction which causes a phase shift, the first and higher order odd harmonics signal appears on the detector 218 with a phase and amplitude directly proportional to the elongation or contraction in the sensitive coil 216. This corresponds to open loop operation. This first harmonic signal can be used to adjust the frequency of the frequency shifter 214 by supplying a signal to the voltage controlled oscillator 224 such that the phase shift due to an elongation is nulled out by a phase shift due to the change in frequency, DF, by driver 224. This will then produce a digital output in a closed loop fashion that is proportional to elongation. The elongation or contraction, L, is given by $L = -L_0 DF/F_0$. Where $L_0$ is the pathlength of the fiber coil 216 and $F_0$ is the nominal center frequency of the acousto-optic modulator. The Sagnac elongation sensor's sensitivity is not a function of the length of the fiber coil but is a function of the distance the frequency shifter 214 is placed from the center of the optical pathlength. This distance represents the length of the elongation sensitive coil 216. This length must be such that the product of the frequency of the frequency shifter with the length of the fiber coil must be an integer multiple in order for the system to be nominally nulled in the absence of an elongation.

Figure 15:
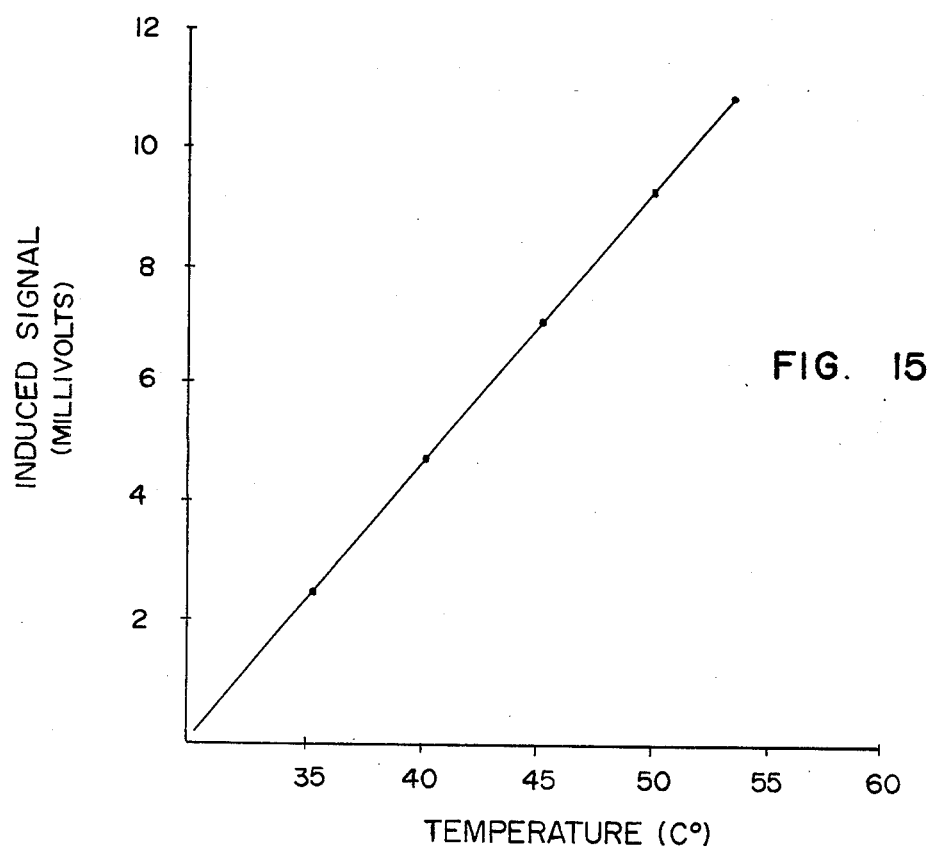
FIG. 15 illustrates data taken with the digital fiber-optic elongation sensor.

FIG. 15 illustrates data taken to demonstrate the ability of a digital fiber-optic sensor to measure elongations or contractions. This data was generated by thermally inducing an optical pathlength difference. To do this, the elongation sensitive portion of the fiber coil, 216 was heated in a thermally controlled chamber. The device was operated in an open loop fashion with the measured first harmonic signal being recorded.

FIG. 16 illustrates a design for a simple basic configuration of a digital fiber-optic elongation sensor. The light source 226, detector 228, polarizer 230 are placed remote from the sensor. A single fiber 232 directs light to and from the sensor and serves as a spatial filter. The light from this fiber is split into counterpropagating beams by a fiber beamsplitter 234. One output from the beamsplitter is directed into a frequency shifter 236 where it is frequency shifted and then directed into the elongation sensitive loop of fiber 238 which is rigidly attached to the strut member 240 of interest. This loop is attached with tension to the strut member so that elongations and contractions in the strut member 240 can be measured. The other output from the beamsplitter 234 goes directly to the sensor loop 238. The clockwise beam travels through the loop and is frequency shifted while the counterclockwise beam is not frequency shifted. The counterclockwise beam exits the loop through the frequency shifter 236 where it then gets frequency shifted. Both beams then recombine at the beamsplitter 234 at the same frequency and are directed to the detector 28. Phase dithering is accomplished with a phase modulator 241 or by frequency modulating the frequency shifter 236.

FIG. 17 illustrates a design for a digital fiber-optic elongation sensor which utilizes a single frequency shifting element 242 as a frequency shifter and a beamsplitter. The frequency shifter is used as a Bragg device and has two outputs. One output is frequency shifted and one output is not frequency shifted. The device works the same as the basic configuration in all other aspects.

FIG. 18 illustrates a design for a thermally compensated digital fiber-optic elongation sensor. This configuration uses two frequency shifters 243 and 244 placed at each end of the elongation sensitive coil 246. One frequency shifter upshifts the frequency of the light, while the other downshifts the frequency of the light. This causes the frequency difference between the two counterpropagating beams to be twice the frequency of one frequency shifter. At the same time the beams traveling to the sensor loop 246 and leaving the sensor loop are at the same frequency, thus thermally desensitizing the input/output fiber 248. Furthermore, the two ends of the elongation sensitive coil are thermally balanced. This technique provides a degree of thermal compensation. This device works the same as previously described devices in all other aspects.

FIG. 19 illustrates a design for a digital fiber-optic elongation sensor which makes use of polarization optics. In this embodiment the polarizer 230 may be two segments of polarization preserving fiber oriented at a 45° angle with each other. In this design a polarization sensitive wedge 250 is placed between the frequency shifter 252 and the input/output fiber loop 254 which is made up of polarization preserving fiber. The polarization sensitive wedge is a birefringent element such as a calcite crystal. The polarization sensitive wedge 250 serves to split the input optical beam into two beams which are in orthogonal polarization states. The polarization sensitive wedge which is in the form of a prism directs the two beams into the frequency shifter 252 at an angle such that one light beam gets frequency shifted and the other light beam passes through unaffected. One polarization state gets frequency shifted while the other one is unaffected. The angle of the input beams can be adjusted so that the frequency shifted beam of one is spatially superimposed with the unshifted beam. Both beams that are superimposed get coupled into a properly aligned piece of polarization preserving fiber 256 which is attached or embedded in the strut member 258 of interest. At the far end of the strut member where the fiber is terminated with a lens 264, a quarter wave plate 260 and a mirror 262 are placed. These components serve to rotate the polarization state of the two beams into the orthogonal state of polarization and then couple the light back into the fiber. For example, the frequency shifted beam which may be in a horizontal state when it emerges the fiber, is transformed into the vertical state when the beam is coupled back into the fiber. The opposite condition holds for the unshifted light beam. The frequency shifter then shifts the unshifted light beam so that when both beams recombine they are at the same frequency on the detector 228. The first harmonic signal appearing on the detector 228 can adjust the frequency of the frequency shifter 252 by supplying a signal through the demodulator 264 to the voltage controlled oscillator VCO such that the phase shift due to an elongation is nulled out by a phase shift due to the change in the frequency by the VCO.

Figure 20:
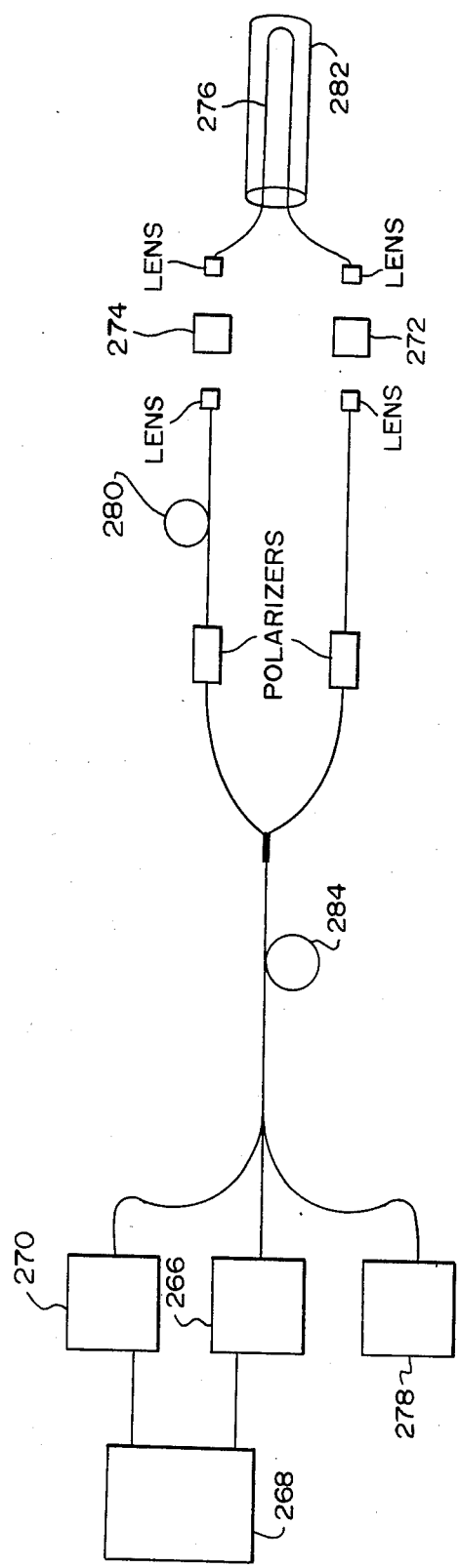
FIG. 20 illustrates a digital fiber-optic elongation sensor which utilizes two light sources at different wavelengths to provide a means for measuring environmental factors.

FIG. 20 illustrates a technique for measuring both elongations and temperature on a strut member 282 by using a digital fiber-optic sensor operating with two light sources at different wavelengths $D_1$ and $D_2$. In this configuration only one light source is used at a time as an input to the fiber polarizer 284. When light source 266 is operated, the source drive/switch 268 turns off light source two 270. The frequency shifters 272 and 274 frequency shift the light such that one of the counterpropagating light beams is upshifted while the other light beam is downshifted. This produces an elongation and temperature sensitive fiber loop 276. Each of the counterpropagating light beams are both upshifted and downshifted such that they both mix on the detector 278 at the same frequency. Changes in the length or temperature of the sensitive fiber loop 276 causes a first harmonic frequency of the phase modulator 280 to appear on the detector 278. This signal can then be used to adjust the frequency of the frequency shifters 272 and 274 such that the nulling condition holds and only a second harmonic of the phase modulator appears. The frequency change is directly proportional to the elongation and temperature change in the fiber loop. The elongation term in the output is wavelength independent. Utilizing this fact, the sensor can be operated with two sources at different wavelengths, thus giving two outputs $F_1$ and $F_2$. Taking the difference between $F_1$ and $F_2$ causes the elongation term to cancel out leaving only the temperature term which is wavelength dependent. By knowing the appropriate material constants, dn/dD that indicates how the index of refraction changes with wavelengths and dn/dT that indicates how the index of refraction changes with temperature, the change in the temperature of the fiber loop can be determined accurately. This information can then be used to completely thermally compensate the elongation sensor.

Figure 21:
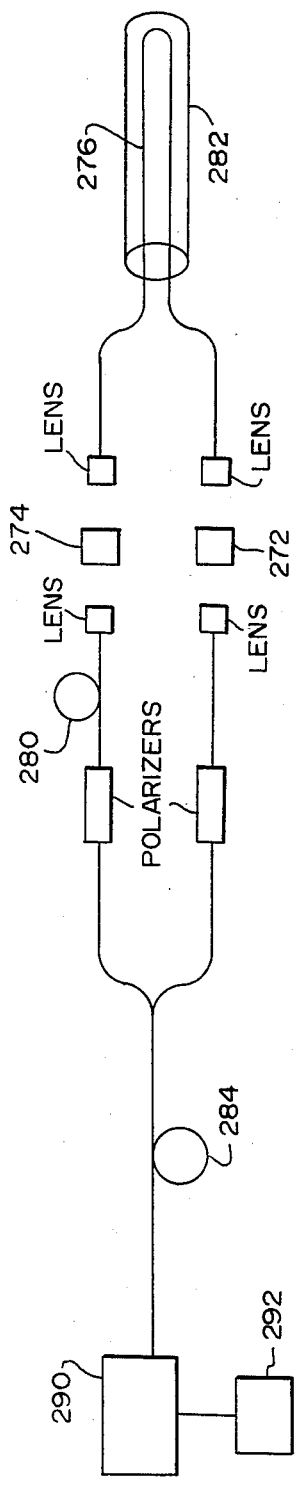
FIG. 21 illustrates a digital fiber-optic elongation sensor which utilizes a single light source capable of operating at different wavelengths to provide a means for measuring environmental factors.

FIG. 21 illustrates an alternate embodiment of the sensor shown in FIG. 20 wherein the light source 290 is capable of operating at different wavelengths depending on the operating conditions of the driver 292. This eliminates the need for switching between two separate light sources.

Figure 22:
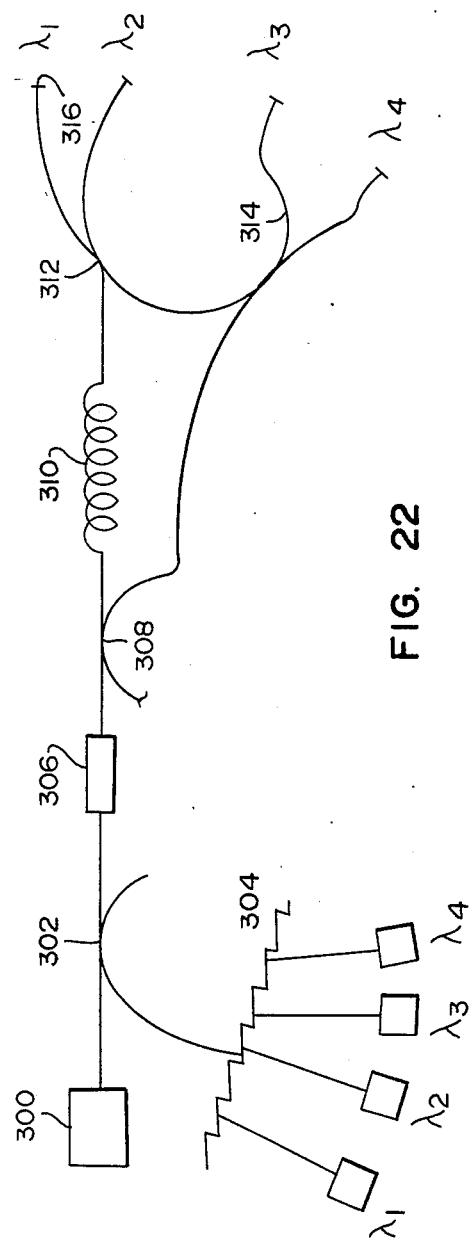
FIG. 22 illustrates a fiber optic sensor utilizing coupling means for a plurality of single sensing fiber configurations.

FIG. 22 illustrates an embodiment of the sensor having multiple sensing elements configured to for different wavelengths. The light source 300 is connected to a first beamsplitter 302 that has one output connected to a filter and detector array 304. A polarizer 306 is connected to another output of the beamsplitter 302 and provides a polarized input to a second beamsplitter 308 that generates counterpropagating beams in a manner hereinbefore described. A reference coil 310 is isolated from environmental effects and the counterpropagating beams are split by star couplers or beamsplitters 312 and 314 into various sensing fiber links. The light beams are reflected from the end of the fiber links and are recombined at the beamsplitter 308. The various wavelengths are selectively filtered and detected by the array 304.

What we claim is:

1. A fiber optic sensor, comprising:
 (a) A light source means for producing a first beam of light;
 (b) a first beam splitting means for receiving the first beam of light having a polarizing means connected to one output for polarizing a portion of the first light beam;
 (c) a second beam splitting means connected to the polarizing means for splitting the polarized portion of the first beam of light into second and third beams of light and recombining the second and third beams into a fourth beam of light;
 (d) an optical fiber loop connected to the second beam splitter means for directing the second and third beams of light in counterpropagating directions;
 (e) a reference fiber optic coil within the optical fiber loop isolated from environmental effects and having the counterpropagating light beams pass therethrough;
 (f) a sensing fiber within the optical fiber loop exposed to environmental effects and having the counterpropagating light beams pass therethrough;
 (g) an intensity maintenance element within the optical fiber loop for preventing signal fadeout having the counterpropagating light beams pass therethrough;

(h) a detection means connected to the first beamsplitting means for detecting the fourth light beam recombined at the second beamsplitting means including electrical circuitry means for measuring the environmental effects on the sensing fiber optic coil by detecting the nonreciprocal phase shift of the counterpropagating beams; and (i) a phase modulating means for offsetting the nonreciprocal phase shift induced in the sensing fiber by environmental effects.

2. A fiber optic sensor as recited in claim 1 wherein the phase modulating means is generally comprised of dual frequency shifting means within the optical fiber loop for offsetting the nonreciprocal phase shift induced in the sensing fiber by environmental effects.

3. A fiber optic sensor as recited in claim 1 wherein the phase modulating means is generally comprised of an electro-optic crystal having connected thereto a sawtooth voltage signal for offsetting the nonreciprocal phase shift induced in the sensing fiber by environmental effects.

4. A fiber optic sensor as recited in claim 1 wherein the phase modulating means is generally comprised of a coil of optical fibers wrapped around a piezoelectric mandril having connected thereto a sawtooth voltage signal for offsetting the nonreciprocal phase shift induced in the sensing fiber by environmental effects.

5. A fiber optic sensor as recited in claim 1 wherein the phase modulating means is generally comprised of an optical fiber with a piezoelectric covering having connected thereto a sawtooth voltage signal for offsetting the nonreciprocal phase shift induced in the sensing fiber by environmental effects.

6. A fiber optic sensor, comprising:
(a) A light source means for producing a first beam of light;
(b) a beam splitting means for splitting the first beam of light into second and third beams of light and recombining the second and third beams into a fourth beam of light;
(c) an optical fiber loop connected to the first beam splitter means for directing the second and third beams of light in counterpropagating directions;
(d) a reference fiber optic coil within the optical fiber loop isolated from environmental effects and having the counterpropagating light beams pass therethrough;
(e) a sensing fiber configured in a long line array connected to the optical fiber loop having the counterpropagating light beams pass therethrough and exposed to environmental effects; and
(f) a detection means connected to the beam splitting means for detecting the fourth light beam recombined at the first beam splitting means including electrical circuitry means or measuring the environmental effects on the sensing fiber by detecting the nonreciprocal phase shift of the counterpropagating beams.

7. A fiber optic sensor, comprising:
(a) A light source means for producing a first beam of light;
(b) a first beam splitting means for receiving the first beam of light having a polarizing means connected to one output for polarizing a portion of the first light beam;

(c) a second beam splitting means connected to the polarizing means for splitting the polarized portion of the first beam of light into second and third beams of light and recombining the second and third beams into a fourth beam of light;
(d) an optical fiber loop connected to the second beam splitter means for directing the second and third beams of light in counterpropagating directions;
(e) a reference fiber optic coil within the optical fiber loop isolated from environmental effects and having the counterpropagating light beams pass therethrough;
(f) a sensing fiber optic coil within the optical fiber loop configured in a long line array exposed to environmental effects and having the counterpropagating light beams pass therethrough; and
(g) a detection means connected to the first beam splitting means for detecting the fourth light beam recombined at the first beam splitting means including electrical circuitry means for measuring the environmental effects on the sensing fiber optic coil by detecting the nonreciprocal phase shift of the counterpropagating beams.

8. A fiber optic sensor, comprising:
(a) A light source means for producing a first beam of light;
(b) a first beam splitting means for receiving the first beam of light having a polarizing means connected to one output for polarizing a portion of the first light beam;
(c) a second beam splitting means connected to the polarizing means for splitting the polarized portion of the first beam of light into a second and third beams of light and recombining the second and third beams into a fourth beam of light;
(d) an optical fiber loop connected to the second beam splitter means for directing the second and third beams of light in counterpropagating directions;
(e) a reference fiber optic coil within the optical fiber loop isolated from environmental effects and having the counterpropagating light beams pass therethrough;
(f) a second beam splitting means connected to the optical fiber loop for directing the counterpropagating beams into a single fiber sensing element having a mirrored end for reflecting the counter propagating beams back to the first beamsplitter means; and
(g) a detection means connected to the first beamsplitting means for detecting the fourth light beam recombined at the second beamsplitting means including electrical circuitry means for measuring the environmental effects on the single fiber sensing element by detecting the nonreciprocal phase shift of the counterpropagating beams.

9. A fiber optic sensor, comprising:
(a) A light source means for producing a first beam of light;
(b) a first beam splitting means for receiving the first beam of light having a polarizing means connected to one output for polarizing a portion of the first light beam;
(c) a second beam splitting means connected to the polarizing means for splitting the polarized portion of the first beam of light into second and third beams of light and recombining the second and third beams into a fourth beam of light;

(d) an optical fiber loop connected to the second beam splitter means for directing the second and third beams of light in counterpropagating directions;

(e) a reference fiber optic coil within the optical fiber loop isolated from environmental effects and having the counterpropagating light beams pass therethrough;

(f) a second beam splitting means connected to the optical fiber loop for directing the counterpropagating beams into a single fiber sensing element having wavelength dividing means for selectively reflecting different wavelengths of the counterpropagating beams to the first beamsplitter means; and (g) a detection means connected to the first beam splitting means for detecting the selective wavelengths of the counterpropagating beams recombined at the first beamsplitting means including electrical circuitry means for measuring the environmental effects on the single fiber sensing element by detecting the nonreciprocal phase shift of the counterpropagating beams.

10. A fiber optic sensor as recited in claim 9 wherein the wavelength dividing means is generally comprised of multiple beamsplitters spaced along the single fiber sensing element.

11. A fiber, optic sensor as recited in claim 9 wherein the wavelength dividing means is generally comprised of color doped reflective elements spaced within the single fiber sensing element.

12. A fiber optic sensor, comprising:
(a) A light source means for producing a series of pulsed light beams;
(b) a first beam splitting means for receiving the pulsed light beams having a polarizing means connected to one output for polarizing a portion of the pulsed beams;
(c) a second beam splitting means connected to the polarizing means for splitting the polarized portion of the pulsed beams of light into second and third pulsed beams of light and recombining the second and third pulsed beams into a fourth pulsed beam of light;
(d) an optical fiber loop connected to the second beam splitter means for directing the second and third pulsed beams of light in counterpropagating directions;
(e) a reference fiber optic coil within the optical fiber loop isolated from environmental effects and having the counterpropagating pulsed light beams pass therethrough;
(f) a second beam splitting means connected to the optical fiber loop for directing the counterpropagating pulsed beams into a single fiber sensing element having partial reflecting means for reflecting a portion of the counterpropagating beams back to the first beamsplitter means; and
(g) a detection means connected to the first beam splitting means for detecting the counterpropagating beams recombined at the first beamsplitting means including electrical circuitry means for time domain multiplexing the recombined pulsed beams and measuring the environmental effects on the single fiber sensing element by detecting the nonreciprocal phase shift of the counterpropagating beams.

13. A fiber optic sensor as recited in claim 12 wherein the partial reflecting means is generally comprised of multiple beamsplitters spaced along the single fiber sensing element.

14. A fiber optic sensor as recited in claim 12 wherein the partial reflecting means is generally comprised of color doped reflective elements spaced within the single fiber sensing element.

15. A fiber optic sensor, comprising:
(a) A light source means for producing a first beam of light;
(b) a first beam splitting means for receiving the first beam of light having a polarizing means connected to one output for polarizing a portion of the first light beam;
(c) a second beam splitting means connected to the polarizing means for splitting polarized portion of the beam of light into second and third beams of light and recombining the second and third beams into a fourth beam of light;
(d) an optical fiber loop connected to the second beam splitter means for directing the second and third beams of light in counterpropagating directions:
(e) a reference fiber optic coil within the optical fiber loop isolated from environmental effects and having the counterpropagating light beams pass therethrough;
(f) a third beamsplitter means connecting within the optical fiber loop for directing the counterpropagating beams into a single fiber sensing element having a mirrored and for reflecting the counterpropagating beams exposed to environmental effects back to the first beam splitting means;
(g) a phase modulating means within the optical fiber loop for offsetting the nonreciprocal phase shift induced in the single fiber sensing element by environmental effects; and
(h) a detection means connected to the first beam splitting means for detecting the counterpropagating beams recombined at the first beamsplitting means including electrical circuitry means for measuring the environmental effects on the single fiber sensing element by detecting the nonreciprocal phase shift of the counterpropagating beams.

16. A fiber optic sensor, comprising:
(a) A light source means for producing a first beam of light;
(b) a first beam splitting means for receiving the first beam of light having a polarizing means connected to another output for polarizing a portion of the first light beam;
(c) a second beam splitting means connected to the polarizing means for splitting the polarized portion of the first beam of light into second and third beams of light and recombining the second and third beams into a fourth beam of light;
(d) an optical fiber loop connected to the second beamsplitter means for directing the second and third beams of light in counterpropagating directions;
(e) a reference fiber optic coil within the optical fiber loop isolated from environmental effects and having the counterpropagating light beams pass therethrough;

(f) a third beamsplitter means connecting within the optical fiber loop for directing the counterpropagating beams into a single fiber sensing element having wavelength dividing means for selectively reflecting different wavelengths of the counterpropagating beams and a mirrored end for reflecting the counterpropagating beams exposed to environmental effects back to the first beam splitting means;

(g) a phase modulating shifting means within the optical fiber loop for offsetting the nonreciprocal phase shift induced in the single fiber sensing element by environmental effects; and (h) a detection means connected to the first beam splitting means for detecting the selective wavelengths of the counterpropagating beams recombined at the second beamsplitting means including electrical circuitry means for measuring the environmental effects on the single fiber sensing element by detecting the nonreciprocal phase shift of the counterpropagating beams.

17. A fiber optic sensor as recited in claim 16 wherein the wavelength dividing means is generally comprised of multiple beamsplitters spaced along the single fiber sensing element.

18. A fiber optic sensor as recited in claim 16 wherein the wavelength dividing means is generally comprised of color doped reflective elements spaced within the single fiber sensing element.

19. A fiber optic sensor, comprising:
(a) A light source means for producing a first beam of light;
(b) a first beam splitting means for receiving the first beam of light having a polarization preserving element connected to one output for orienting the polarization state of the first light beam;
(c) a collimating means connected to the polarization preserving element for collimating the first light beam into a polarization sensitive wedge;
(d) the polarization sensitive wedge splits the first light beam into second and third beams having orthogonal polarization states and directing the beams into a frequency shifting means;
(e) the frequency shifting means connected to the polarization sensitive wedge for frequency upshifting the second and frequency down-shifting third beams of light;
(f) a polarization preserving sensing fiber connected to the frequency shifting means for receiving the phase shifted second and third beams of light with the polarization preserving axes of the fiber aligned with the orthogonal polarization states of the two light beams;
(g) a lens connected to the end of the sensing fiber such that the two orthogonal beams are focused on a quarter wave plate and mirror means for rotating the polarization states fo the light beams 90° and coupling the second and third beams back through the sensing fiber such that they are recombined into a fourth beam of light at the polarization sensitive wedge; and
(h) a detection means connected to the first beam splitting means for detecting the fourth light beam recombined at the polarization sensitive wedge including electrical circuitry means for measuring the environmental effects on the sensing fiber by detecting the nonreciprocal phase shift of the orthogonal beams.

20. A fiber optic sensor as recited in claim 19 wherein the frequency shifting means has connected thereto electrical feedback means for changing the frequency of the frequency shifting means to offset the nonreciprocal phase shift induced in the sensing fiber by environmental effects.

21. A fiber optic sensor, comprising:
(a) A light source means for producing a first beam of light;
(b) a first beam splitting means for receiving the first beam of light having a polarizing means connected to one output for polarizing a potion of the first light beam;
(c) a second beam splitting means connected to the polarizing means for splitting the polarized portion of the beam of light into second and third beams of light and recombining the second and third beams into a fourth beam of light;
(d) a pair of depolarizing elements connected to the second beamsplitting means for maintaining the intensity of the second and third light beams
(e) an optical fiber loop connected to the depolarizing elements for directing the second and third beams of light in counterpropagating directions;
(f) a phase modulating means within the optical fiber loop for phase modulating the counterpropagating light beams;
(g) a sensing fiber optic coil within the optical fiber loop exposed to environmental effects and having the counterpropagating light beams pass therethrough;
(h) a frequency shifting means connected to the sensing fiber coil for shifting the counterpropagating light beams to different frequencies; and
(i) a detection means connected to the first beam splitting means for detecting the amplitude and-phase of the odd harmonics of phase modulated frequency contained in the fourth light beam recombined at the second beamsplitting means including electrical circuitry means for measuring the environmental effects on the sensing fiber optic coil by detecting the nonreciprocal phase shift of the counterpropagating beams.

22. A fiber optic sensor as recited in claim 21 wherein the sensing fiber optic coil is configured in a long line array.

23. A fiber optic sensor as recited in claim 22 wherein electrical feedback means is connected to the frequency shifting means for adjusting the frequency of the frequency shifting means to null out the non-reciprocal phase shift induced in the fiber optic sensing coil by environmental effects providing a digital output.

24. A fiber optic sensor as recited in claim 23 wherein dual frequency shifting means is provided within the optical fiber loop for frequency upshifting and frequency downshifting the counterpropagating light beams passing therethrough.

25. A fiber optic sensor, comprising:
(a) A light source means for producing a first beam of light;
(b) a first beamsplitting means having a polarizing means connected to one output for polarizing a portion of the first light beam;
(c) a frequency shifting means connected to ther polarizing means for splitting the polarized portion of the first light beam into second and third light beams having a frequency shift therebetween and recombining the second and third light beams into a fourth beam of light.
(d) an optical fiber sensing loop connected to the frequency shifting means for receiving and directing the second and third beams of light in counterpropagating directions;
(e) a pair of depolarizing elements connected to the fiber sensing loop for maintaining the intensity of the second and third light beams;
(f) a phase modulating means within the optical fiber sensing loop for phase modulating the counterpropagating beams; and
(g) a detection means connected to the first beamsplitting means for detecting the fourth light beam recombined at the frequency shifting means including electrical circuitry means for measuring the environmental effects on the sensing fiber optic coil by detecting the amplitude and phase of the odd harmonics of the phase modulated frequency which corresponds to the nonreciprocal phase shift of the counterpropagating beams.

26. A fiber optic sensor as recited in claim 25 wherein electrical feedback means is connected to the frequency shifting means for adjusting the frequency of the frequency shifting means to null out the non-reciprocal phase shift induced in the fiber optic sensing coil by environmental effects providing a digital output.

27. A fiber optic sensor, comprising:
(a) A first light source means for producing a first beam of light at a first wavelength;
(b) A second light source means for producing a second beam of light at a second wavelength;
(c) A switching means connected to the first and second light source means for switching between the two;
(d) a first coupling means connected to the first and second light source means for receiving a beam of light having a photodetector means connected to one output for monitoring the light source output and a polarizing means connected to another output for polarizing a portion of the light beam;
(e) a beam splitting means connected to the polarizing means for splitting polarized portion of the beam of light into second and third beams of light and recombining the second and third beams into a fourth beam of light;
(f) a sensing fiber optic coil connected to the beamsplitting means for directing the second and third light beams in counterpropagating directions;
(g) a pair of depolarizing elements connected to the fiber sensing loop for maintaining the intensity of the second and third light beams;
(h) a phase modulation means within the optical fiber loop for phase modulating the counterpropagating light beams passing therethrough;
(i) a frequency shifting means within the optical fiber loop for frequency upshifting and frequency downshifting the counterpropagating light beams passing therethrough; and
(j) a detection means connected to the first beam splitting means for detecting the fourth light beam recombined at the first beamsplitting means including electrical circuitry means for measuring the environmental effects on the sensing fiber optic coil by detecting the nonreciprocal phase shift of the counterpropagating beams.

28. A fiber optic sensor as recited in claim 27 wherein electrical feedback means is connected to the frequency shifting means for adjusting the frequency of the frequency shifting means to null out the non-reciprocal phase shift induced in the fiber optic sensing coil by environmental effects providing a digital output.

29. A fiber optic sensor as recited in claim 28 wherein the first and second light source means in combination is generally comprised of a single light source means capable of operating at multiple wavelengths which can be selected by controlling the operating conditions of the light source.

* * * * *